US009548059B2

(12) United States Patent
Liljeryd et al.

(10) Patent No.: US 9,548,059 B2
(45) **Date of Patent: *Jan. 17, 2017**

(54) SPECTRAL TRANSLATION/FOLDING IN THE SUBBAND DOMAIN

(71) Applicant: Dolby International AB, Amsterdam Zuidoost (NL)

(72) Inventors: Lars G. Liljeryd, Stocksund (SE); Per Ekstrand, Saltsjobaden (SE); Fredrik Henn, Huddinge (SE); Kristofer Kjoerling, Solna (SE)

(73) Assignee: Dolby International AB, Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/964,836

(22) Filed: Dec. 10, 2015

(65) Prior Publication Data

US 2016/0093310 A1 Mar. 31, 2016

Related U.S. Application Data

(63) Continuation of application No. 13/969,708, filed on Aug. 19, 2013, now Pat. No. 9,245,534, which is a continuation of application No. 13/460,797, filed on Apr. 30, 2012, now Pat. No. 8,543,232, which is a continuation of application No. 12/703,553, filed on Feb. 10, 2010, now Pat. No. 8,412,365, which is a continuation of application No. 12/253,135, filed on Oct. 16, 2008, now Pat. No. 7,680,552, which is a continuation of application No. 10/296,562, filed as (Continued)

(51) Int. Cl.

*G06F 17/00* (2006.01)
*G10L 19/02* (2013.01)
*G10L 21/038* (2013.01)
*G10L 19/26* (2013.01)
*G10L 19/00* (2013.01)

(52) U.S. Cl.

CPC ....... *G10L 19/0208* (2013.01); *G10L 19/0017* (2013.01); *G10L 19/26* (2013.01); *G10L 19/265* (2013.01); *G10L 21/038* (2013.01); *G10L 19/0204* (2013.01)

(58) Field of Classification Search

CPC .. G10L 19/02; G10L 19/0204; G10L 19/0212; G10L 19/022; G10L 21/038; H04B 1/66; H04B 1/667; G06F 3/16; G06F 3/165
USPC .... 700/94; 704/500–504; 369/1–12; 381/119
See application file for complete search history.

(56) References Cited

U.S. PATENT DOCUMENTS 6,456,657 B1 9/2002 Yeap
7,483,758 B2 * 1/2009 Liljeryd ................ G10L 21/038 700/94

(Continued)

*Primary Examiner* — Andrew C Flanders

(57) ABSTRACT

The present invention relates to a new method and apparatus for improvement of High Frequency Reconstruction (HFR) techniques using frequency translation or folding or a combination thereof. The proposed invention is applicable to audio source coding systems, and offers significantly reduced computational complexity. This is accomplished by means of frequency translation or folding in the subband domain, preferably integrated with spectral envelope adjustment in the same domain. The concept of dissonance guard-band filtering is further presented. The proposed invention offers a low-complexity, intermediate quality HFR method useful in speech and natural audio coding applications.

20 Claims, 5 Drawing Sheets

Related U.S. Application Data application No. PCT/SE01/01171 on May 23, 2001, now Pat. No. 7,483,758.

(56) References Cited

U.S. PATENT DOCUMENTS

| | | | | |
|---|---|---|---|---|
| 7,680,552 | B2 * | 3/2010 | Liljeryd | G10L 21/038 700/94 |
| 8,412,365 | B2 * | 4/2013 | Liljeryd | G10L 21/038 700/94 |
| 8,543,232 | B2 * | 9/2013 | Liljeryd | G10L 21/038 700/94 |
| 9,245,534 | B2 * | 1/2016 | Liljeryd | G10L 21/038 |

* cited by examiner

SPECTRAL TRANSLATION/FOLDING IN THE SUBBAND DOMAIN

CROSS-REFERENCE TO RELATED APPLICATIONS

This application is a continuation of U.S. patent application Ser. No. 13/969,708 filed Aug. 19, 2013, which is a continuation of U.S. patent application Ser. No. 13/460,797 filed Apr. 30, 2012, now U.S. Pat. No. 8,543,232, which is a continuation of U.S. patent application Ser. No. 12/703,553 filed Feb. 10, 2012, now U.S. Pat. No. 8,412,365, which is a continuation of U.S. patent application Ser. No. 12/253,135 filed Oct. 16, 2008, now U.S. Pat. No. 7,680,552, which is a continuation of U.S. patent application Ser. No. 10/296,562 filed Jan. 6, 2004, now U.S. Pat. No. 7,483,753 which is a national-stage entry of International patent application no. PCT/SE01/01171 filed May 23, 2001, all of which are hereby incorporated by reference.

TECHNICAL FIELD

The present invention relates to a new method and apparatus for improvement of High Frequency Reconstruction (HFR) techniques, applicable to audio source coding systems. Significantly reduced computational complexity is achieved using the new method. This is accomplished by means of frequency translation or folding in the subband domain, preferably integrated with the spectral envelope adjustment process. The invention also improves the perceptual audio quality through the concept of dissonance guard-band filtering. The proposed invention offers a low-complexity, intermediate quality HFR method and relates to the PCT patent Spectral Band Replication (SBR) [WO 98/57436].

BACKGROUND OF THE INVENTION

Schemes where the original audio information above a certain frequency is replaced by gaussian noise or manipulated lowband information are collectively referred to as High Frequency Reconstruction (HFR) methods. Prior-art HFR methods are, apart from noise insertion or non-linearities such as rectification, generally utilizing so-called copy-up techniques for generation of the highband signal. These techniques mainly employ broadband linear frequency shifts, i.e. translations, or frequency inverted linear shifts, i.e. foldings. The prior-art HFR methods have primarily been intended for the improvement of speech codec performance. Recent developments in highband regeneration using perceptually accurate methods, have however made HFR methods successfully applicable also to natural audio codecs, coding music or other complex programme material, PCT patent [WO 98/57436]. Under certain conditions, simple copy-up techniques have shown to be adequate when coding complex programme material as well. These techniques have shown to produce reasonable results for intermediate quality applications and in particular for codec implementations where there are severe constraints for the computational complexity of the overall system.

The human voice and most musical instruments generate quasistationary tonal signals that emerge from oscillating systems. According to Fourier theory, any periodic signal may be expressed as a sum of sinusoids with frequencies f, 2f, 3f, 4f, 5f etc. where f is the fundamental frequency. The frequencies form a harmonic series. Tonal affinity refers to the relations between the perceived tones or harmonics. In natural sound reproduction such tonal affinity is controlled and given by the different type of voice or instrument used. The general idea with HFR techniques is to replace the original high frequency information with information created from the available lowband and subsequently apply spectral envelope adjustment to this information. Prior-art HFR methods create highband signals where tonal affinity often is uncontrolled and impaired. The methods generate non-harmonic frequency components which cause perceptual artifacts when applied to complex programme material. Such artifacts are referred to in the coding literature as "rough" sounding and are perceived by the listener as distortion.

Sensory dissonance (roughness), as opposed to consonance (pleasantness), appears when nearby tones or partials interfere. Dissonance theory has been explained by different researchers, amongst others Plomp and Levelt ["Tonal Consonance and Critical Bandwidth" R. Plomp, W. J. M. Levelt JASA, Vol 38, 1965], and states that two partials are considered dissonant if the frequency difference is within approximately 5 to 50% of the bandwidth of the critical band in which the partials are situated. The scale used for mapping frequency to critical bands is called the Bark scale. One bark is equivalent to a frequency distance of one critical band. For reference, the function $$z(f) = \frac{26.81}{1 + \frac{1960}{f}} - 0.53 \text{ [Bark]} \tag{1}$$

can be used to convert from frequency (f) to the bark scale (z). Plomp states that the human auditory system can not discriminate two partials if they differ in frequency by approximately less than five percent of the critical band in which they are situated, or equivalently, are separated less than 0.05 Bark in frequency. On the other hand, if the distance between the partials are more than approximately 0.5 Bark, they will be perceived as separate tones.

Dissonance theory partly explains why prior-art methods give unsatisfactory performance. A set of consonant partials translated upwards in frequency may become dissonant. Moreover, in the crossover regions between instances of translated bands and the lowband the partials can interfere, since they may not be within the limits of acceptable deviation according to the dissonance-rules.

SUMMARY OF THE INVENTION

The present invention provides a new method and device for improvements of translation or folding techniques in source coding systems. The objective includes substantial reduction of computational complexity and reduction of perceptual artifacts. The invention shows a new implementation of a subsampled digital filter bank as a frequency translating or folding device, also offering improved crossover accuracy between the lowband and the translated or folded bands. Further, the invention teaches that crossover regions, to avoid sensory dissonance, benefits from being filtered. The filtered regions are called dissonance guard-bands, and the invention offers the possibility to reduce dissonant partials in an uncomplicated and accurate manner using the subsampled filterbank.

The new filterbank based translation or folding process may advantageously be integrated with the spectral envelope adjustment process. The filterbank used for envelope adjustment is then used for the frequency translation or folding process as well, in that way eliminating the need to use a separate filterbank or process for spectral envelope adjustment. The proposed invention offers a unique and flexible filterbank design at a low computational cost, thus creating a very effective translation/folding/envelope-adjusting system.

In addition, the proposed invention is advantageously combined with the Adaptive Noise-Floor Addition method described in PCT patent [SE00/00159]. This combination will improve the perceptual quality under difficult programme material conditions.

The proposed subband domain based translation of folding technique comprise the following steps:

- filtering of a lowband signal through the analysis part of a digital filterbank to obtain a set of subband signals;
- repatching of a number of the subband signals from consecutive lowband channels to consecutive highband channels in the synthesis part of a digital filterbank;
- adjustment of the patched subband signals, in accordance to a desired spectral envelope; and
- filtering of the adjusted subband signals through the synthesis part of a digital filterbank, to obtain an envelope adjusted and frequency translated or folded signal in a very effective way.

Attractive applications of the proposed invention relates to the improvement of various types of intermediate quality codec applications, such as MPEG 2 Layer III, MPEG 2/4 AAC, Dolby AC-3, NTT TwinVQ, AT&T/Lucent PAC etc. where such codecs are used at low bitrates. The invention is also very useful in various speech codecs such as G. 729 MPEG-4 CELP and HVXC etc to improve perceived quality. The above codecs are widely used in multimedia, in the telephone industry, on the Internet as well as in professional multimedia applications.

BRIEF DESCRIPTION OF THE DRAWINGS

The present invention is described by way of illustrative examples, not limiting the scope or spirit of the invention, with reference to the accompanying drawings, in which.

DESCRIPTION OF PREFERRED EMBODIMENTS

Digital Filterbank Based Translation and Folding

New filter bank based translating or folding techniques will now be described. The signal under consideration is decomposed into a series of subband signals by the analysis part of the filterbank. The subband signals are then repatched, through reconnection of analysis- and synthesis subband channels, to achieve spectral translation or folding or a combination thereof.

Figure 2:
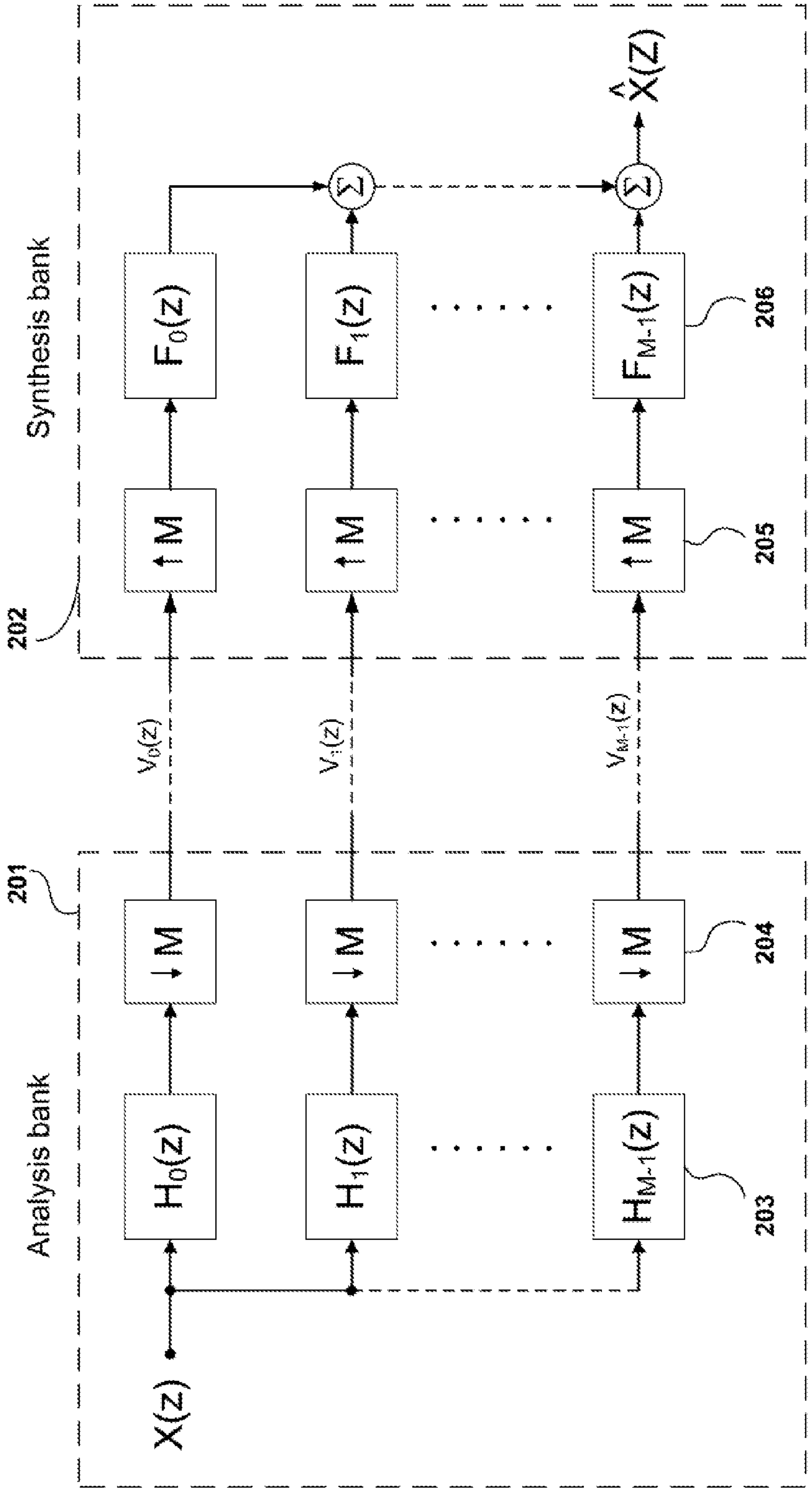
FIG. 2 shows a basic structure of a maximally decimated filterbank.

FIG. 2 shows the basic structure of a maximally decimated filterbank analysis/synthesis system. The analysis filter bank 201 splits the input signal into several subband signals. The synthesis filter bank 202 combines the subband samples in order to recreate the original signal. Implementations using maximally decimated filter banks will drastically reduce computational costs. It should be appreciated, that the invention can be implemented using several types of filter banks or transforms, including cosine or complex exponential modulated filter banks, filter bank interpretations of the wavelet transform, other non-equal bandwidth filter banks or transforms and multi-dimensional filter banks or transforms.

In the illustrative, but not limiting, descriptions below it is assumed that an L-channel filter bank splits the input signal x(n) into L subband signals. The input signal, with sampling frequency $f_s$, is bandlimited to frequency $f_c$. The analysis filters of a maximally decimated filter bank (FIG. 2) are denoted $H_k(z)$ 203, where k=0, 1, . . . , L−1. The subband signals $v_k(n)$ are maximally decimated, each of sampling frequency $f_s/L$, after passing the decimators 204. The synthesis section, with the synthesis filters denoted $F_k(z)$, reassembles the subband signals after interpolation 205 and filtering 206 to produce $\hat{x}(n)$. In addition, the present invention performs a spectral reconstruction on $\hat{x}(n)$, giving an enhanced signal y(n).

The reconstruction range start channel, denoted M, is determined by $$M = \text{floor}\left\{\frac{f_c}{f_s}2L\right\}. \tag{2}$$

The number of source area channels is denoted S(1≤S≤M). Performing spectral reconstruction through translation on $\hat{x}(n)$ according to the present invention, in combination with envelope adjustment, is accomplished by repatching the subband signals as $$v_{M+k}(n)=e_{M+k}(n)v_{M-S-P+k}(n), \tag{3}$$

where k ∈[0, S−1], $(-1)^{S+P}=1$, i.e. S+P is an even number, P is an integer offset (0≤P≤M−S) and $e_{M+k}(n)$ is the envelope correction. Performing spectral reconstruction through folding on $\hat{x}(n)$ according to the present invention, is further accomplished by repatching the subband signals as $$v_{M+k}(n)=e_{M+k}(n)v^{*}_{M-P-S-k}(n), \tag{4}$$

where k ∈[0, S−1], $(-1)^{S+P}=-1$, i.e. S+P is an odd integer number, P is an integer offset (1−S≤P≤M−2S+1) and $e_{M+k}(n)$ is the envelope correction. The operator [*] denotes complex conjugation. Usually, the repatching process is repeated until the intended amount of high frequency bandwidth is attained.

It should be noted that, through the use of the subband domain based translation and folding, improved crossover accuracy between the lowband and instances of translated or folded bands is achieved, since all the signals are filtered through filterbank channels that have matched frequency responses.

If the frequency $f_c$ of x(n) is too high, or equivalently $f_s$ is too low, to allow an effective spectral reconstruction, i.e. M+S>L, the number of subband channels may be increased after the analysis filtering. Filtering the subband signals with a QL-channel synthesis filter bank, where only the L lowband channels are used and the upsampling factor Q is chosen so that QL is an integer value, will result in an output signal with sampling frequency $Qf_s$. Hence, the extended filter bank will act as if it is an L-channel filter bank followed by an upsampler. Since, in this case, the L(Q−1) highband filters are unused (fed with zeros), the audio bandwidth will not change—the filter bank will merely reconstruct an upsampled version of $\hat{x}(n)$. If, however, the L subband signals are repatched to the highband channels, according to Eq.(3) or (4), the bandwidth of $\hat{x}(n)$ will be increased. Using this scheme, the upsampling process is integrated in the synthesis filtering. It should be noted that any size of the synthesis filter bank may be used, resulting in different sampling rates of the output signal.

Figure 3:
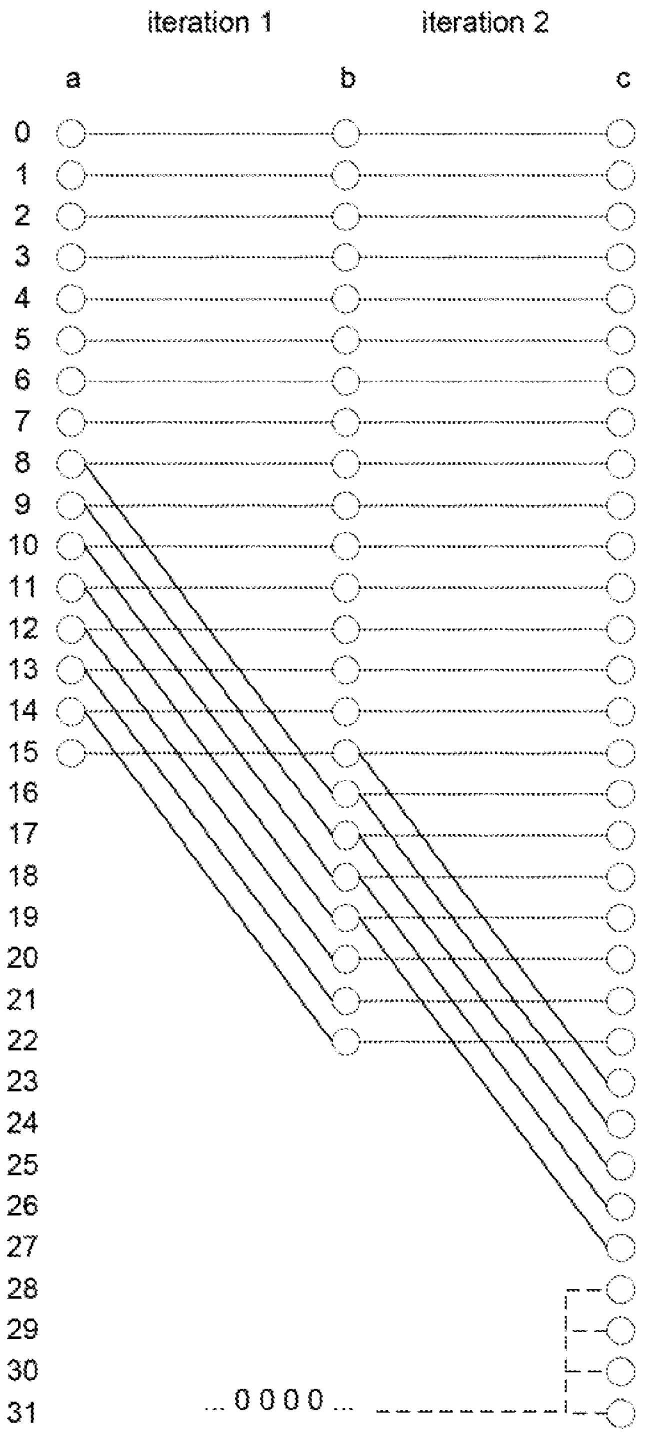
FIG. 3 illustrates spectral translation according to the present invention.

Referring to FIG. 3, consider the subband channels from a 16-channel analysis filterbank. The input signal x(n) has frequency contents up to the Nyqvist frequency ($f_c=f_s/2$). In the first iteration, the 16 subbands are extended to 23 subbands, and frequency translation according to Eq.(3) is used with the following parameters: M=16, S=7 and P=1. This operation is illustrated by the repatching of subbands from point a to b in the figure. In the next iteration, the 23 subbands are extended to 28 subbands, and Eq.(3) is used with the new parameters: M=23, S=5 and P=3. This operation is illustrated by the repatching of subbands from point b to c. The so-produced subbands may then be synthesized using a 28-channel filterbank. This would produce a critically sampled output signal with sampling frequency 28/16 $f_s$=1.75 $f_s$. The subband signals could also be synthesized using a 32-channel filterbank, where the four uppermost channels are fed with zeros, illustrated by the dashed lines in the figure, producing an output signal with sampling frequency $2f_s$.

Figure 4:
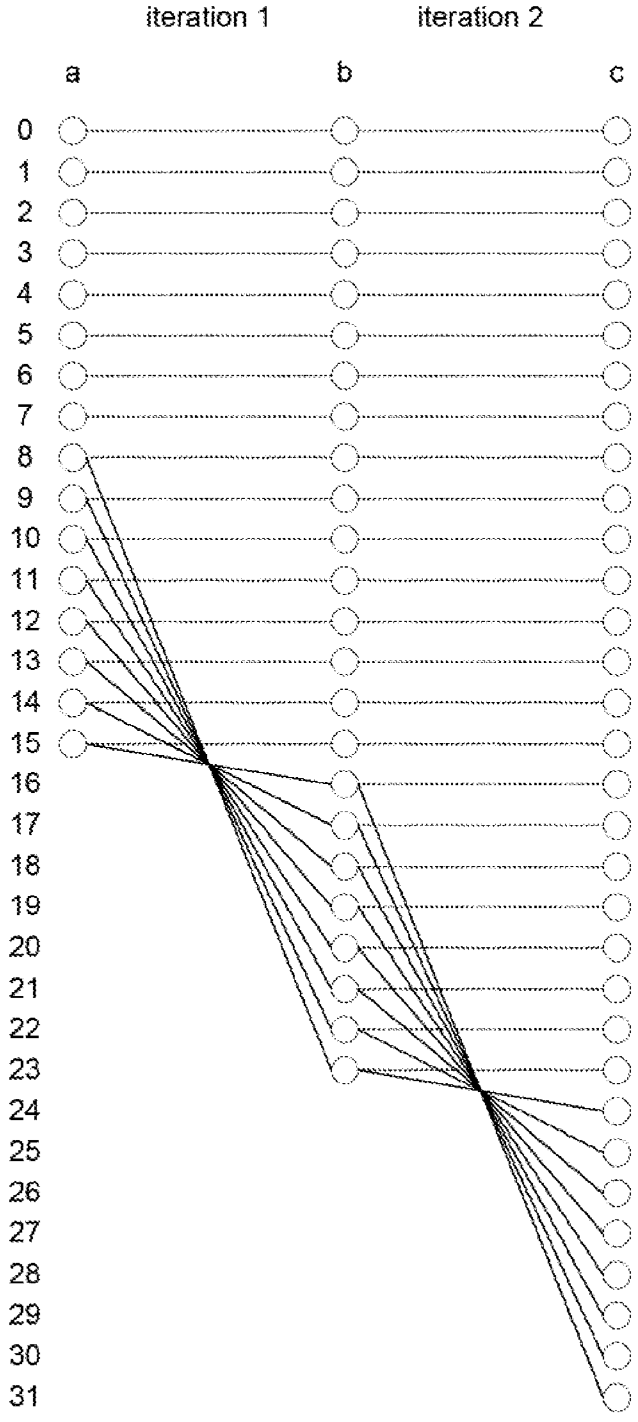
FIG. 4 illustrates spectral folding according to the present invention.

Using the same analysis filterbank and an input signal with the same frequency contents, FIG. 4 illustrates the repatching using frequency folding according to Eq.(4) in two iterations. In the first iteration M=16, S=8 and P=−7, and the 16 subbands are extended to 24. In the second iteration M=24, S=8 and P=−7, and the number of subbands are extended from 24 to 32. The subbands are synthesized with a 32-channel filterbank. In the output signal, sampled at frequency $2f_s$, this repatching results in two reconstructed frequency bands—one band emerging from the repatching of subband signals to channels 16 to 23, which is a folded version of the bandpass signal extracted by channels 8 to 15, and one band emerging from the repatching to channels 24 to 31, which is a translated version of the same bandpass signal.

Guardbands in High Frequency Reconstruction

Sensory dissonance may develop in the translation or folding process due to adjacent band interference, i.e. interference between partials in the vicinity of the crossover region between instances of translated bands and the lowband. This type of dissonance is more common in harmonic rich, multiple pitched programme material. In order to reduce dissonance, guard-bands are inserted and may preferably consist of small frequency bands with zero energy, i.e. the crossover region between the lowband signal and the replicated spectral band is filtered using a bandstop or notch filter. Less perceptual degradation will be perceived if dissonance reduction using guard-bands is performed. The bandwidth of the guard-bands should preferably be around 0.5 Bark. If less, dissonance may result and if wider, comb-filter-like sound characteristics may result.

In filterbank based translation or folding, guard-bands could be inserted and may preferably consist of one or several subband channels set to zero. The use of guardbands changes Eq.(3) to $$v_{M+D+k}^{(n)}=e_{M+D+k}^{(n)}v_{M-S-P+k}^{(n)}, \tag{5}$$

and Eq.(4) to $$v_{M+D+k}^{(n)}=e_{M+D+k}^{(n)}v^{*}{}_{M-P-S-k}^{(n)}, \tag{6}$$

Figure 5:
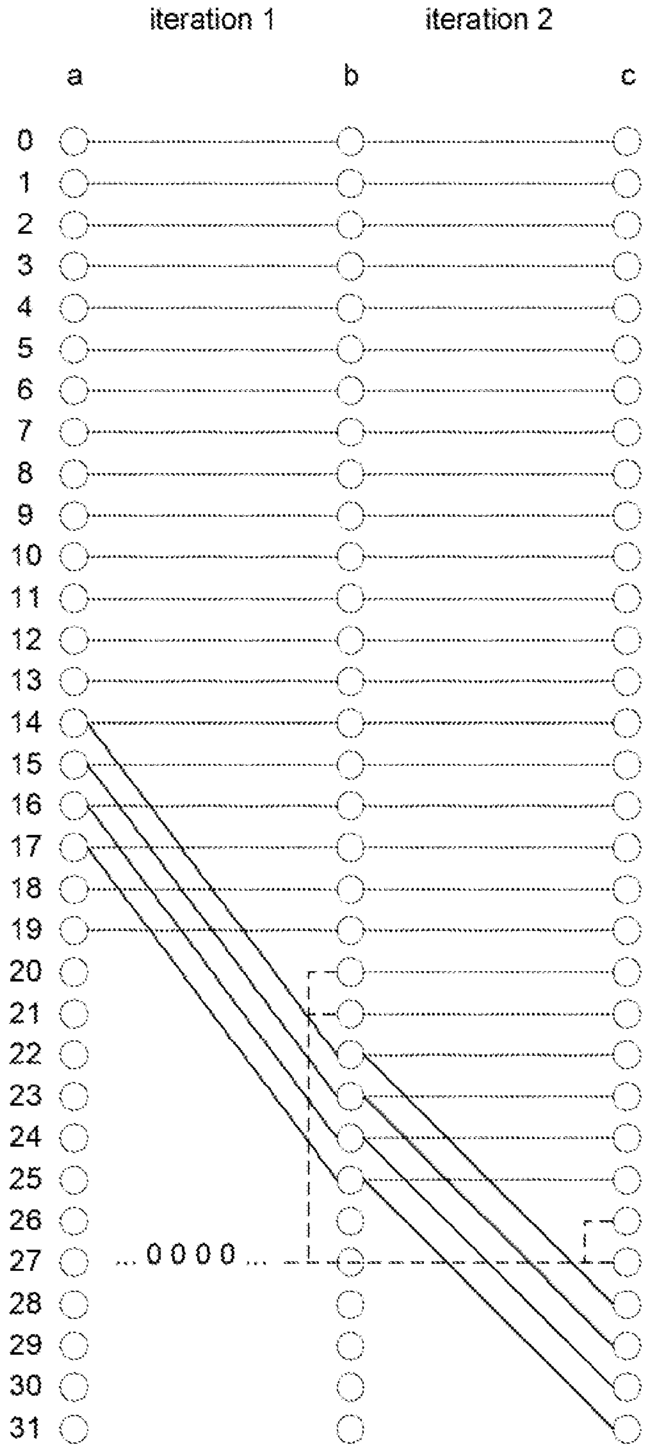
FIG. 5 illustrates spectral translation using guard-bands according to the present invention.

D is a small integer and represents the number of filterbank channels used as guardband. Now P+S+D should be an even integer in Eq.(5) and an odd integer in Eq.(6). P takes the same values as before. FIG. 5 shows the repatching of a 32-channel filterbank using Eq.(5). The input signal has frequency contents up to $f_c$=5/16 $f_s$, making M=20 in the first iteration. The number of source channels is chosen as S=4 and P=2. Further, D should preferably be chosen as to make the bandwidth of the guardbands 0.5 Bark. Here, D equals 2, making the guardbands $f_s$/32 Hz wide. In the second iteration, the parameters are chosen as M=26, S=4, D=2 and P=0. In the figure, the guardbands are illustrated by the subbands with the dashed line-connections.

In order to make the spectral envelope continuous, the dissonance guard-bands may be partially reconstructed using a random white noise signal, i.e. the subbands are fed with white noise instead of being zero. The preferred method uses Adaptive Noise-floor Addition (ANA) as described in the PCT patent application [SE00/00159]. This method estimates the noise-floor of the highband of the original signal and adds synthetic noise in a well-defined way to the recreated highband in the decoder.

Practical Implementations

Figure 1:
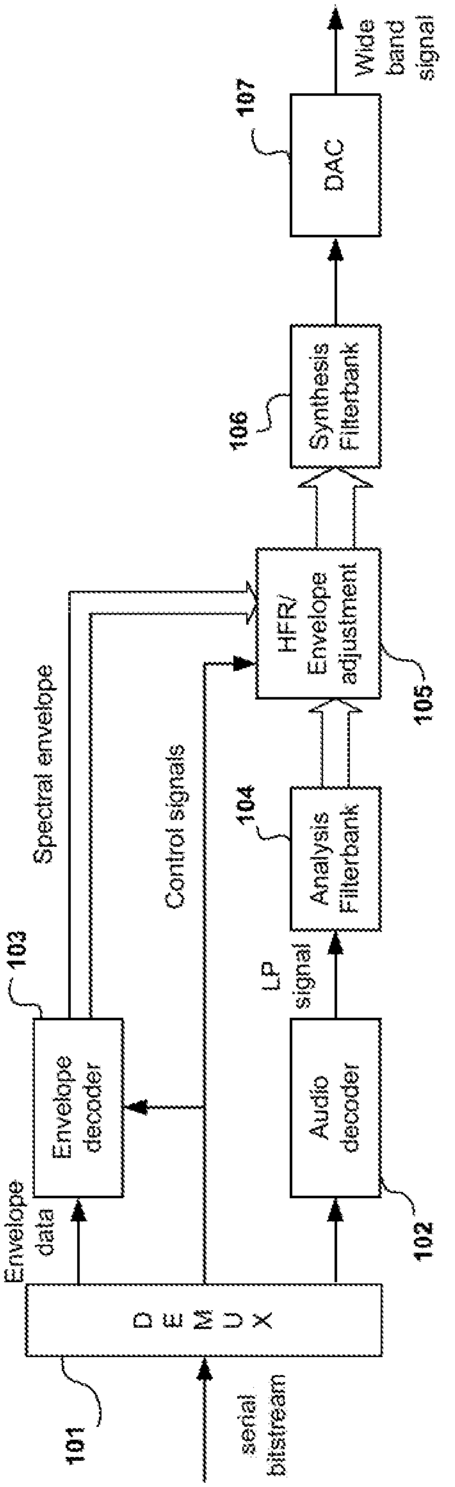
FIG. 1 illustrates filterbank-based translation or folding integrated in a coding system according to the present invention.

The present invention may be implemented in various kinds of systems for storage or transmission of audio signals using arbitrary codecs. FIG. 1 shows the decoder of an audio coding system. The demultiplexer 101 separates the envelope data and other HFR related control signals from the bitstream and feeds the relevant part to the arbitrary lowband decoder 102. The lowband decoder produces a digital signal which is fed to the analysis filterbank 104. The envelope data is decoded in the envelope decoder 103, and the resulting spectral envelope information is fed together with the subband samples from the analysis filterbank to the integrated translation or folding and envelope adjusting filterbank unit 105. This unit translates or folds the lowband signal, according to the present invention, to form a wideband signal and applies the transmitted spectral envelope. The processed subband samples are then fed to the synthesis filterbank 106, which might be of a different size than the analysis filterbank. The digital wideband output signal is finally converted 107 to an analogue output signal.

The above-described embodiments are merely illustrative for the principles of the present invention for improvement of High Frequency Reconstruction (HFR) techniques using filterbank-based frequency translation or folding. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. A decoder for generating an analogue output signal from digital coded signals, the digital coded signals comprising a digital coded lowband audio signal, the decoder comprising:

a separator configured to separate the digital coded lowband audio signal from the digital coded signals;

an audio decoder configured to decode the digital coded lowband audio signal to obtain a digital decoded audio signal;

a digital analysis filterbank configured to generate a plurality of digital source range subband signals;

a high frequency reconstruction/envelope adjustment unit configured to generate a plurality of consecutive digital reconstruction range subband signals by frequency-translating at least a subset of the digital source range subband signals and to apply an envelope correction, wherein frequencies of the digital reconstruction range subband signals are higher than frequencies of the digital source range subband signals, and wherein a digital source range subband signal having a subband index i is frequency-translated to a digital reconstruction range subband signal having a subband index j, and wherein a digital source range subband signal having a subband index i+1 is frequency-translated to a digital reconstruction range subband signal having a subband index j+1;

a digital synthesis filterbank configured to generate a wideband digital output signal by filtering the digital source range subband signals and the digital reconstruction range subband signals; and a digital to analogue converter configured to convert the wideband digital output signal to the analogue output signal.

2. The decoder according to claim 1, wherein the digital coded signals further comprise digital coded envelope data, and the separator is further configured to separate the digital coded envelope data from the digital coded signals, wherein the decoder further comprises an envelope decoder configured to decode the digital coded envelope data to obtain digital envelope information, and wherein the spectral envelope information is provided to the high frequency reconstruction/envelope adjustment unit and is used in applying the envelope correction.

3. The decoder according to claim 1, wherein one or more of the digital analysis filterbank and the digital synthesis filterbank is obtained by cosine or sine modulation of a lowpass prototype filter.

4. The decoder according to claim 3, wherein the lowpass prototype filter is designed so that a transition band of a subband of said digital filterbank overlaps a passband of neighbouring subbands only.

5. The decoder according to claim 1, wherein one or more of the digital analysis filterbank and the digital synthesis filterbank is obtained by complex-exponential-modulation of a lowpass prototype filter.

6. The decoder according to claim 5, wherein the lowpass prototype filter is designed so that a transition band of a subband of said digital filterbank overlaps a passband of neighbouring subbands only.

7. The decoder according to claim 1, wherein one or more digital dissonance guardband subband signals are positioned between the digital source range subband signals and the digital reconstruction range subband signals.

8. The decoder according to claim 7, in which one or more of the digital dissonance guard band subband signals comprises zeros or gaussian noise.

9. The decoder according to claim 7, in which a combined bandwidth of the digital dissonance guard band subband signals is approximately one half Bark.

10. The decoder according to claim 1, wherein the high frequency reconstruction/envelope adjustment unit is further configured to generate additional consecutive digital reconstruction range subband signals by frequency translating and envelope adjusting one or more of the consecutive digital reconstruction range subband signals, and wherein generating the wideband digital output signal further comprises filtering the additional consecutive digital reconstruction range subband signals.

11. A method for generating an analogue output signal from digital coded signals, the digital coded signals comprising a digital coded lowband audio signal, the method comprising:

separating the digital coded lowband audio signal from the digital coded signals;

audio decoding the digital coded lowband audio signal to obtain a digital decoded audio signal;

generating a plurality of digital source range subband signals by filtering the digital decoded audio signal using a digital analysis filterbank;

generating a plurality of consecutive digital reconstruction range subband signals by frequency-translating at least a subset of the digital source range subband signals and applying an envelope correction, wherein frequencies of the digital reconstruction range subband signals are higher than frequencies of the digital source range subband signals, and wherein a digital source range subband signal having a subband index i is frequency-translated to a digital reconstruction range subband signal having a subband index j, and wherein a digital source range subband signal having a subband index i+1 is frequency-translated to a digital reconstruction range subband signal having a subband index j+1;

generating a wideband digital output signal by filtering the digital source range subband signals and the digital reconstruction range subband signals using a digital synthesis filterbank; and generating the analogue output signal by applying a digital-to-analogue conversion to the wideband digital output signal.

12. The method according to claim 11, in which the digital coded signals further comprise digital coded envelope data, and the method further comprises:

separating the digital coded envelope data from the digital coded signals, decoding the digital coded envelope data to obtain digital envelope information, and using the digital envelope information for applying the envelope correction.

13. The method according to claim 11, wherein one or more of the digital analysis filterbank and the digital synthesis filterbank is obtained by cosine or sine modulation of a lowpass prototype filter.

14. The method according to claim 13, wherein the lowpass prototype filter is designed so that a transition band of a subband of said digital filterbank overlaps a passband of neighbouring subbands only.

15. The method according to claim 11, wherein one or more of the digital analysis filterbank and the digital synthesis filterbank is obtained by complex-exponential-modulation of a lowpass prototype filter.

16. The method according to claim 15, wherein the lowpass prototype filter is designed so that a transition band of a subband of said digital filterbank overlaps a passband of neighbouring subbands only.

17. The method according to claim 11, wherein one or more digital dissonance guardband subband signals are positioned between the digital source range subband signals and the digital reconstruction range subband signals.

18. The method according to claim 17, in which one or more of the digital dissonance guard band subband signals comprises zeros or gaussian noise.

19. The method according to claim 17, in which a total bandwidth of the one or more digital dissonance guard band subband signals is approximately one half Bark.

20. The method according to claim 11, further comprising generating additional consecutive digital reconstruction range subband signals by frequency translating and envelope adjusting one or more of the consecutive digital reconstruction range subband signals, wherein generating the wideband digital output signal further comprises filtering the additional consecutive digital reconstruction range subband signals.

* * * * *